J. G. MILES.
EXPOSURE INDICATOR FOR CAMERAS.
APPLICATION FILED JAN. 5, 1916.
1,195,062.
Patented Aug. 15, 1916.
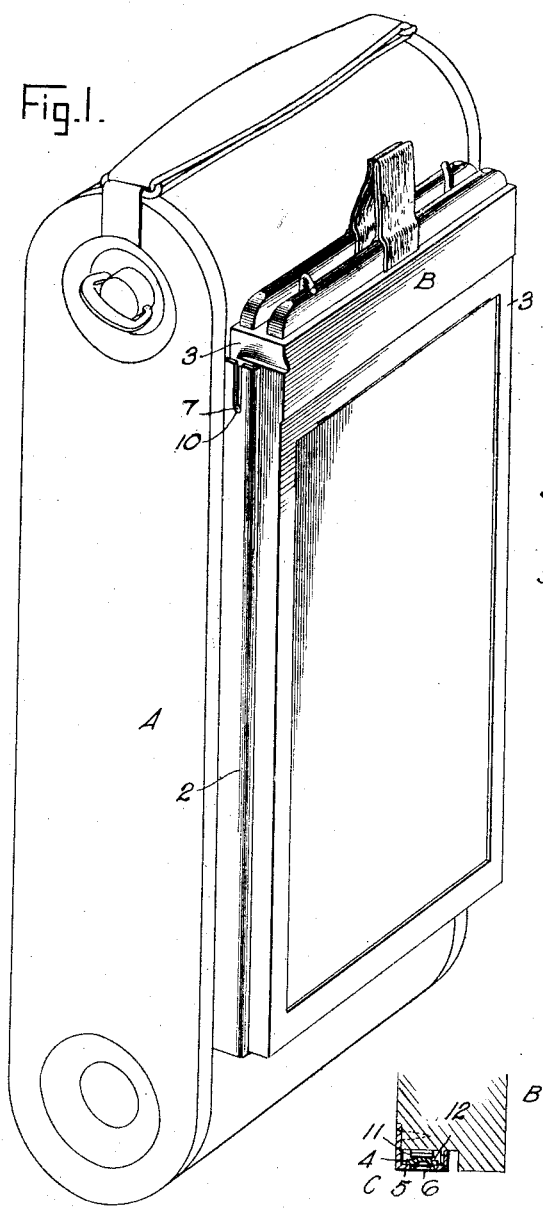
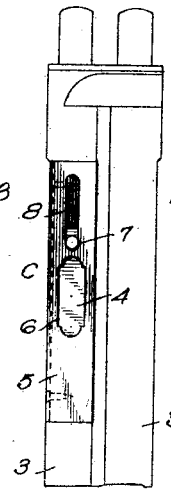
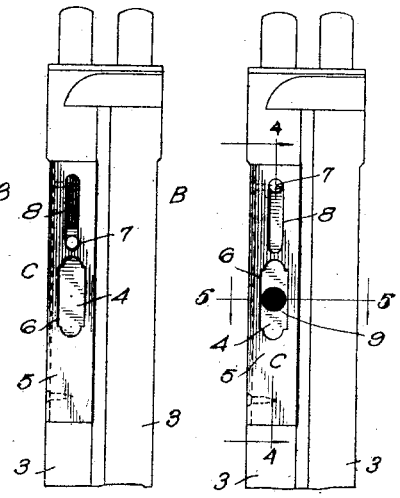
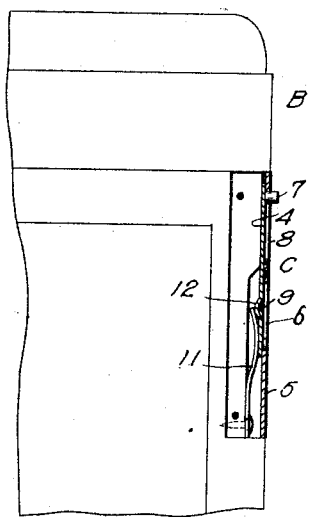
WITNESSES
INVENTOR
J. G. Miles
BY
ATTORNEYS

UNITED STATES PATENT OFFICE.

JOHN G. MILES, OF MONTEVIDEO, URUGUAY.

EXPOSURE-INDICATOR FOR CAMERAS.

1,195,062.  Specification of Letters Patent.  Patented Aug. 15, 1916.

Application filed January 5, 1916. Serial No. 70,433.

*To all whom it may concern:*

Be it known that I, JOHN G. MILES, a subject of the King of England, and a resident of Montevideo, Uruguay, South America, have invented a new and Improved Exposure-Indicator for Cameras, of which the following is a full, clear, and exact description.

This invention relates to cameras, and has to deal particularly with an exposure indicator whereby it is possible to determine whether or not plates in a holder have been exposed.

The invention has for its general objects to improve and simplify the construction and operation of exposure indicators of the character referred to so as to be reliable and efficient in use, comparatively inexpensive to manufacture, and so designed that it is susceptible of use in connection with plate holders of ordinary construction.

A more specific object of the invention is the provision of an indicator which is mounted on the edges of the plate holder, there being an indicator for each plate, and when the plate holder is inserted in the camera for exposing a plate, the mere insertion of the holder will set the indicator so that when the holder is removed it will indicate that the plate has been exposed.

With such objects in view, and others which will appear as the description proceeds, the invention comprises various novel features of construction and arrangement of parts which will be set forth with particularity in the following description and claims appended hereto.

In the accompanying drawing which illustrates one embodiment of the invention and wherein similar characters of reference indicate corresponding parts in all the views, Figure 1 is a perspective view of a camera and plate holder with the indicator applied; Fig. 2 is a side view of a plate holder with the indicator in non-indicating position; Fig. 3 is a similar view with the indicator in indicating position; Fig. 4 is a detail sectional view on the line 4—4, Fig. 3; and Fig. 5 is a horizontal section on the line 5—5, Fig. 3.

In the present instance the invention is shown in connection with a certain type of camera, but it is to be understod that it may be applied to any other type of camera.

Referring to the drawing, A designates the body of the camera and B the plate holder which is removably applied to the camera back 1 which has the usual flanges 2 or equivalent means for receiving the plate holder B. The indicating device C is applied to each section 3 of the plate holder, the indicating device of one section being at the opposite side of the plate holder from the indicating device on the other section. This indicating device comprises a slide 4 which is movable vertically and is retained in place by a retaining strip 5 of approximately U-shaped cross-section, which is fitted to the side edge of the plate holder section. This plate or guard 5 has a slot 6 through which is exposed different portions of the slide 4.

Fastened to the upper end of the slide 4 is a pin or projection 7 which protrudes through a slot 8 in the plate 5. This pin is adapted to strike an abutment on the camera, so that when the plate holder is slid into position the abutment on the camera will strike the pin 7 and arrest the slide while the plate holder is being pushed home. By so doing a portion of the slide 4 is brought opposite the opening 6 so as to indicate that the plate in the section of the holder with which the indicator is associated has been placed in exposing position in the camera. In the present instance a black mark 9 on the slide 4 serves to indicate an exposure, but any other conventional mark, letter or word may be used. In the present instance the abutment with which the pin 7 engages is the bottom of a slot 10 in the flange 2 at the left side of the camera. Before the holder is placed in the camera the slide 4 is in the position shown in Fig. 2, with the pin or projection 7 at the bottom of the slot 8. As the plate holder is slid into the camera the pin 7 strikes the bottom 10 of the slot in the camera before the plate holder is pushed home, and by the further movement of the plate holder the indicating plate 4 shifts from the position shown in Fig. 2 to that shown in Fig. 3. Behind the slide 4 is a spring 11 which serves to frictionally engage the slide and hold it in either of its extreme positions, there being a projection or cam surface 12 on the rear side of the slide 4 to coöperate with the spring 11 to insure the holding of the slide 4 against accidental movement. When the plate holder has been taken out and reversed for exposing the other plate the other indicator will be moved to indicating position in the manner above described. The pins 7 by projecting from the sides of the plate holder will effectively serve as indicating means in the dark.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a camera having means for receiving a plate holder, with a plate holder insertible in the said means, an indicator on the plate holder including a movable element, a member projecting from the said element and from the side of the holder, and an abutment on the camera engageable by the said member before the plate holder is fully inserted, whereby the insertion of the plate holder moves an indicating element to exposing position.

2. A camera plate holder divided into sections, an exposure indicator for each section, said indicator comprising an element movably mounted on the side of the holder, a member projecting from the said element and beyond the side of the holder to engage a part carried by the camera, whereby the element is moved automatically to exposure-indicating position as the plate holder is affixed to the camera.

3. A camera plate holder, an exposure indicator in the form of a slide movably mounted on one side of the holder, a retaining plate overlying the slide and having an opening through which a portion of the slide is visible, and a member extending from the slide adapted to engage a fixed part of a camera, whereby the slide is moved to exposure-indicating position upon the insertion of the plate holder in the camera.

In testimony whereof I have signed my name to this specification in the presence of two subscribing witnesses.

JOHN G. MILES.

Witnesses:
 ALFRED L. BROOKS,
 EUGENE W. BLATTER.

Copies of this patent may be obtained for five cents each, by addressing the "Commissioner of Patents, Washington, D. C."